US011120282B2

(12) United States Patent
Nishimura (10) Patent No.: US 11,120,282 B2
(45) Date of Patent: Sep. 14, 2021

(54) TRAFFIC VIOLATION VEHICLE IDENTIFICATION SYSTEM, SERVER AND NON-TRANSITORY RECORDING MEDIUM IN WHICH VEHICLE CONTROL PROGRAM IS RECORDED

(71) Applicant: TOYOTA JIDOSHA KABUSHIKI KAISHA, Toyota (JP)

(72) Inventor: Kazuya Nishimura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 78 days.

(21) Appl. No.: 16/572,237

(22) Filed: Sep. 16, 2019

(65) Prior Publication Data

US 2020/0117928 A1    Apr. 16, 2020

(30) Foreign Application Priority Data

Oct. 12, 2018  (JP) .............................. JP2018-193513

(51) Int. Cl.
*G06K 9/00* (2006.01)
*H04L 29/08* (2006.01)
*G06T 7/70* (2017.01)
*G06T 7/20* (2017.01)

(52) U.S. Cl.
CPC ............ *G06K 9/00825* (2013.01); *G06T 7/20* (2013.01); *G06T 7/70* (2017.01); *H04L 67/12* (2013.01); *G06T 2207/30248* (2013.01)

(58) Field of Classification Search
CPC ......... G06K 9/00825; G06T 7/70; G06T 7/20; H04L 67/12
See application file for complete search history.

(56) References Cited

U.S. PATENT DOCUMENTS

| 7,986,339 | B2 * | 7/2011 | Higgins | ................ | G08G 1/054 |
| | | | | | 348/149 |
| 8,775,235 | B2 * | 7/2014 | Hedley | ................ | G08G 1/0175 |
| | | | | | 705/13 |
| 2010/0245125 | A1 * | 9/2010 | Wike, Jr. | ................ | G08G 1/052 |
| | | | | | 340/928 |

(Continued)

FOREIGN PATENT DOCUMENTS

| CN | 104916138 A | 9/2015 |
| CN | 106128108 A | 11/2016 |
| JP | 2017-22484 A | 1/2017 |

*Primary Examiner* — Md K Talukder
(74) *Attorney, Agent, or Firm* — Oblon, McClelland, Maier & Neustadt, L.L.P.

(57) ABSTRACT

A traffic violation vehicle identification system, a server and a non-transitory recording medium is provided. The traffic violation vehicle identification system includes a first vehicle and a server. The first vehicle is configured to generate a first picture by photographing a traffic light in an travel direction of the first vehicle and an oncoming vehicle or a crossing vehicle at an intersection, and send violation vehicle information including characteristic information about a traffic violation vehicle performing a traffic violation and a first sending picture, to the server, when the first vehicle detects the traffic violation vehicle in the first picture, the first sending picture being at least a part of the first picture including an evidence picture of the traffic violation, the characteristic information being extracted from the first picture.

16 Claims, 8 Drawing Sheets

(56) References Cited

U.S. PATENT DOCUMENTS

| | | | |
|---|---|---|---|
| 2013/0039588 A1* | 2/2013 | Li | G06T 1/0028 |
| | | | 382/201 |
| 2014/0211012 A1* | 7/2014 | Nerayoff | G06Q 20/145 |
| | | | 348/148 |
| 2015/0104071 A1* | 4/2015 | Martin | G08G 1/0129 |
| | | | 382/104 |
| 2018/0240336 A1* | 8/2018 | Kareev | G06K 9/00771 |
| 2019/0068712 A1* | 2/2019 | Chen | G07C 5/008 |
| 2019/0197889 A1* | 6/2019 | Kanehara | G08G 1/054 |
| 2020/0043326 A1* | 2/2020 | Tao | G08G 1/054 |
| 2020/0117928 A1* | 4/2020 | Nishimura | G06K 9/00791 |

* cited by examiner

TRAFFIC VIOLATION VEHICLE IDENTIFICATION SYSTEM, SERVER AND NON-TRANSITORY RECORDING MEDIUM IN WHICH VEHICLE CONTROL PROGRAM IS RECORDED

INCORPORATION BY REFERENCE

The disclosure of Japanese Patent Application No. 2018-193513 filed on Oct. 12, 2018 including the specification, drawings and abstract is incorporated herein by reference in its entirety.

BACKGROUND

1. Technical Field

The disclosure relates to a traffic violation vehicle identification system, a server and a non-transitory recording medium in which a vehicle control program is recorded.

2. Description of Related Art

A stationary camera or the like is installed at a heavily trafficked intersection or the like, and a traffic violation or the like is detected. Further, a number plate and a driver of the violation vehicle are discriminated from a taken image, and are used for crackdown on traffic violations and accident response. For example, Japanese Patent Application Publication No. 2017-22484 (JP 2017-22484 A) discloses a traffic violation management system. In the traffic violation management system, a speed detection sensor, a near-infrared camera and the like are installed at an intersection, and monochrome images are acquired by the camera. When a traffic violation by a vehicle is detected, the monochrome images are changed into color images.

SUMMARY

In the above-described traffic violation management system, the system including cameras needs to be previously installed at intersections and the like. For exhaustively performing the crackdown on traffic violations at many intersections, the scale of traffic infrastructure investment is large. Further, at local intersections where cameras and the like are not installed, it is difficult to prevent a vehicle accident due to a red light running and specify a violation vehicle.

The disclosure provides a technology of finding a traffic violation vehicle and acquiring an evidence for identifying the traffic violation vehicle even at an intersection where a stationary camera and the like are not installed.

A first aspect of the disclosure provides a traffic violation vehicle identification system including a first vehicle and a server. The first vehicle is configured to generate a first picture by photographing a traffic light in an travel direction of the first vehicle and an oncoming vehicle or a crossing vehicle at an intersection, and send violation vehicle information including characteristic information about a traffic violation vehicle performing a traffic violation and a first sending picture, to the server, when the first vehicle detects the traffic violation vehicle in the first picture, the first sending picture being at least a part of the first picture including an evidence picture of the traffic violation, the characteristic information being extracted from the first picture. The server is configured to extract identification information by which the traffic violation vehicle is uniquely identified, from the first sending picture, store the identification information, and send the identification information about the traffic violation vehicle and the evidence picture of the traffic violation, to a client.

A second aspect of the disclosure provides a server including circuitry configured to: receive violation vehicle information and a first sending picture from a first vehicle, the violation vehicle information including characteristic information about a traffic violation vehicle performing a traffic violation, the first sending picture being at least a part of a first picture including an evidence picture of the traffic violation; extract identification information by which the traffic violation vehicle is uniquely identified, from the first sending picture; store the identification information, and send the identification information about the traffic violation vehicle and the evidence picture of the traffic violation, to a client.

A third aspect of the disclosure provides a non-transitory recording medium in which a vehicle control program is recorded. When the vehicle control program is executed by a control unit of a first vehicle, the control unit of the first vehicle executes an operation, including: (a) generating a first picture by photographing a traffic light in a travel direction of the first vehicle and an oncoming vehicle or a crossing vehicle at an intersection with a photographing unit of the first vehicle; (b) determining whether there is a traffic violation by the oncoming vehicle or the crossing vehicle, based on the first picture; (c) extracting violation vehicle information including characteristic information about a vehicle performing the traffic violation, from the first picture, when there is the traffic violation; and (d) sending the violation vehicle information and a first sending picture to a server by a sending unit of the first vehicle, the violation vehicle information including the characteristic information about the vehicle performing the traffic violation, the first sending picture being at least a part of the first picture including an evidence picture of the traffic violation.

With the aspect of the disclosure, it is possible to find a traffic violation vehicle and acquire an evidence for identifying the traffic violation vehicle even at an intersection where a stationary camera and the like are not installed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a diagram for describing a situation in which a second vehicle takes a picture including the license number of the traffic violation vehicle, and the like;

DETAILED DESCRIPTION OF EMBODIMENTS

Hereinafter, an embodiment of the disclosure will be described with use of the drawings.

Figure 1:
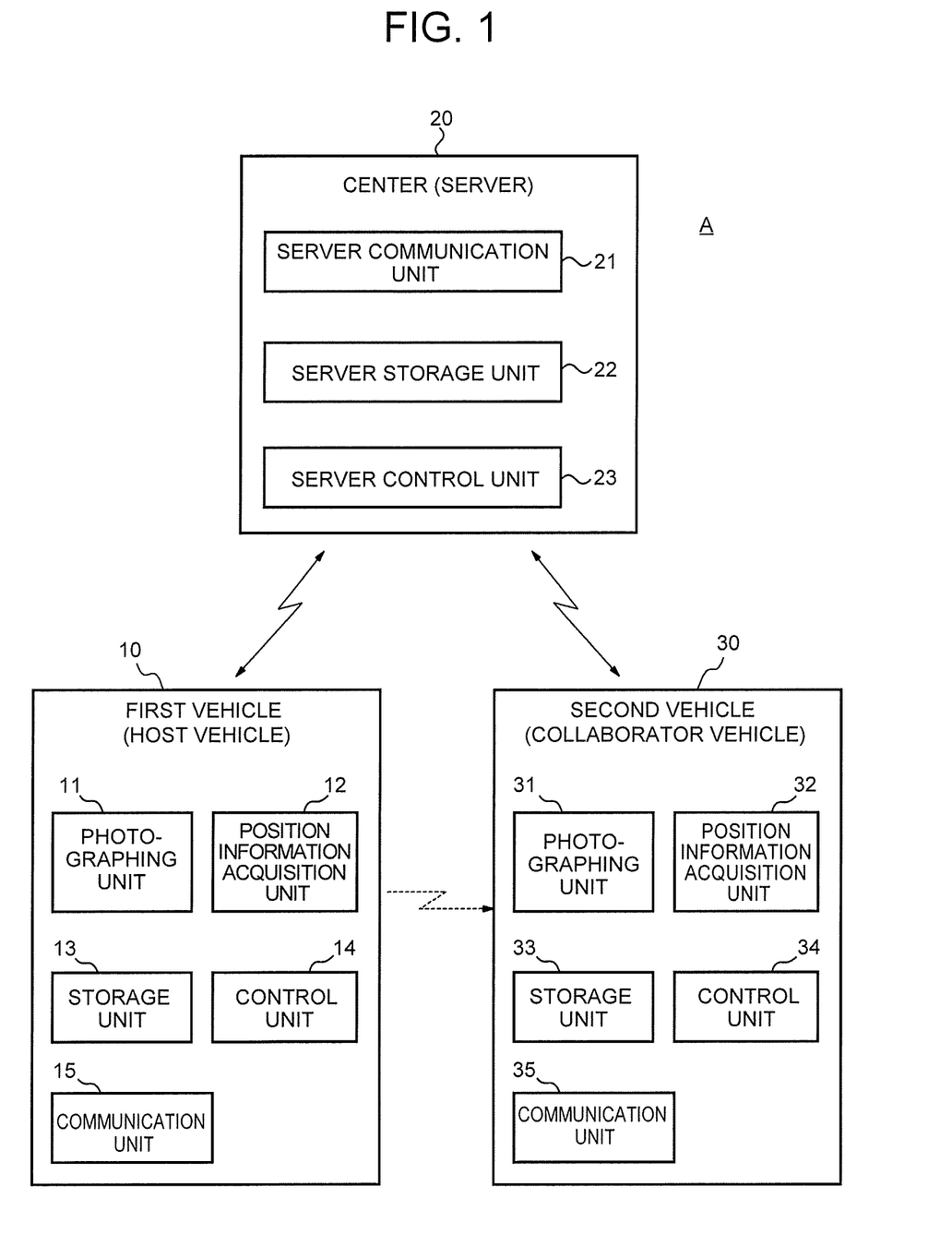
FIG. 1 is an overall view of an exemplary traffic violation vehicle identification system in an embodiment of the disclosure.

FIG. 1 is an overall view of an exemplary traffic violation vehicle identification system A in an embodiment of the disclosure. The traffic violation vehicle identification system A includes a first vehicle (which will be described as a host vehicle herein) 10, a center (server) 20, a second vehicle (which will be described as a collaborator vehicle herein) 30. As described later with an example, the traffic violation vehicle identification system A may include a plurality of second vehicles 30.

First, an overview of the traffic violation vehicle identification system A in the embodiment will be described. At an intersection, the first vehicle (host vehicle) 10 takes a picture of a traffic light in a host-vehicle travel direction and an oncoming vehicle or a crossing vehicle (a vehicle that passes so as to cross in front of the host vehicle), with an in-vehicle camera. Here, "taking a picture of a traffic light" might be regarded as taking a picture of a traffic light from which a state of the traffic light (i.e. the color of the light of the traffic light) is recognized. From taken pictures, the first vehicle 10 detects, for example, an oncoming vehicle that enters the intersection when the color of the traffic light in the host-vehicle travel direction is red, a vehicle that crosses in front of the host vehicle at the intersection when the color of the traffic light in the host-vehicle travel direction is green, or the like, as a traffic violation vehicle, and sends an evidence picture of the traffic violation and violation vehicle information including characteristic information (color, vehicle type and the like) about the traffic violation vehicle, a traveling speed, a traveling direction, the position of the intersection, and the like, to the server 20.

The server 20 extracts identification information such as the license number of the traffic violation vehicle, from the sent picture. Alternatively, the server 20 estimates the current or future traveling position of the traffic violation vehicle, from the sent information, and sends the characteristic information about the traffic violation vehicle to the second vehicle (collaborator vehicle) 30 near the estimated position. The second vehicle 30 near the traffic violation vehicle detects the traffic violation vehicle based on the characteristic information, takes a picture of the number plate, the driver and the like of the traffic violation vehicle, and sends the picture to the server 20.

Thereafter, the server 20 collects information from each vehicle, and sends (reports) the license number, the evidence picture and the like of the traffic violation vehicle, to a client (for example, a system that is managed by the police). Thus, in the embodiment, a plurality of vehicles, in cooperation, finds and identifies the traffic violation vehicle, using in-vehicle cameras.

Back to FIG. 1, the internal configurations of the first vehicle 10, the center (server) 20 and the second vehicle 30, which constitute the system A, will be described.

The first vehicle 10 includes a photographing unit 11, a position information acquisition unit 12, a storage unit 13, a control unit 14, and a communication unit 15.

The photographing unit 11 is a so-called in-vehicle camera, and includes a camera that photographs a forward view (outside) of the vehicle. Preferably, the photographing unit 11 should be a drive recorder that continuously generates pictures of the forward view of the vehicle during driving and during stop and records the generated pictures in the storage unit 13. While the host vehicle is stopped at the intersection, the photographing unit 11 continuously generates a picture (first picture) of the crossing vehicle (the vehicle that passes so as to cross in front of the host vehicle) or oncoming vehicle that enters the intersection, with an image of the traffic light.

The position information acquisition unit 12 includes one or more receivers that corresponds to any satellite positioning system. For example, the position information acquisition unit 12 may include a global positioning system (GPS) receiver. The position information acquisition unit 12 detects position information about the host vehicle. The position information acquisition unit 12 may be configured to acquire the information on the orientation of the host vehicle facing, together with the stop position (or the traveling position) of the host vehicle.

The storage unit 13 is a device that records or stores a variety of information, and includes one or more memories. The "memory" includes, for example, a semiconductor memory, a magnetic memory and an optical memory, but is not limited to them. Each memory included in the storage unit 13 may function, for example, as a main storage device, an auxiliary storage device or a cache memory. The storage unit 13 stores therein any information relevant to operations of the first vehicle. For example, the storage unit 13 stores the picture generated by the photographing unit 11 and the position information acquired by the position information acquisition unit 12, in association with timing information at the time of the generation of the picture. Further, the storage unit 13 stores therein information resulting from analyzing and processing the generated picture in the control unit 14. Furthermore, the storage unit 13 accumulates a variety of information relevant to operations and controls of the vehicle, as exemplified by a vehicle control program of the host vehicle.

The control unit 14 includes one or more processors. The "processor" may be a general-purpose processor or may be a dedicated processor for a particular process. For example, an electronic control unit (ECU) mounted on the first vehicle 10 may function as the control unit 14. The control unit 14 controls the operation of the whole of the first vehicle 10. For example, the control unit 14 performs controls of the photographing unit 11, the position information acquisition unit 12, the storage unit 13 and the communication unit 15, and performs all controls relevant to the traveling and operation of the host vehicle. The control unit 14 can perform image analysis, and detects the color of the traffic light, from the image of the traffic light that is generated by the photographing unit 11. Further, the control unit 14 can extract the characteristic information (color, shape, vehicle type and the like) about the vehicle, from the picture of the crossing vehicle or oncoming vehicle that enters the intersection, and can calculate the speed of the crossing vehicle, from the continuously taken pictures of the vehicle that crosses in front of the host vehicle.

The communication unit 15 includes a communication module that performs communication between the host vehicle and the server 20. As necessary, the communication unit 15 may include a communication module that performs inter-vehicle communication between the host vehicle (first vehicle) and another vehicle (second vehicle) without the server 20. The communication unit 15 may include a communication module that is connected to a network, or a communication module that supports mobile communication standards such as 4th generation (4G) and 5th generation (5G). For example, an on-board communicator such as a data communication module (DCM) mounted on the first vehicle 10 may function as the communication unit 15. The communication unit 15 can perform communication for the characteristic information about the traffic violation vehicle, can send the picture of the intersection that is an evidence of the traffic violation, to the server 20, and can receive instructions and information from the server 20.

The center (server) 20 includes a server communication unit 21, a server storage unit 22 and a server control unit 23.

The server communication unit 21 includes a communication module that performs communication between the server 20 and the first and second vehicles, or communication between the server 20 and the client (the police system or the like). The server communication unit 21 may include a communication module that is connected to a network. The server communication unit 21 can receive information sent from the first vehicle 10 or the second vehicle 30, and can send information and instructions to the first vehicle 10 or the second vehicle 30. Furthermore, the server communication unit 21 can send identification information (the vehicle license number, a photograph of a driver, or the like) by which the traffic violation vehicle is uniquely identified, the evidence picture of the traffic violation, and the like, to the client, and can provide information.

The server storage unit 22 is a device that records or stores a variety of information, and includes one or more memories. The "memory" includes, for example, a semiconductor memory, a magnetic memory and an optical memory, but is not limited to them. Each memory included in the server storage unit 22 may function, for example, as a main storage device, an auxiliary storage device or a cache memory. For example, the server storage unit 22 accumulates information (the characteristic information about the traffic violation vehicle, the evidence picture of the traffic violence, and the like) sent from the first vehicle 10 and information (the vehicle license number, the picture of the driver, and the like) sent from the second vehicle 30. The server storage unit 22 stores information resulting from analyzing and processing the sent picture in the server control unit 23, and accumulates a variety of information relevant to operations and control of the server and the whole system.

The server control unit 23 includes one or more processors. The "processor" may be a general-purpose processor or may be a dedicated processor for a particular process. The server control unit 23 controls the server communication unit 21 and the server storage unit 22, and performs all controls relevant to operations of the server and the whole system. For example, the server control unit 23 analyzes information (the traveling speed and traveling direction of the traffic violation vehicle, and the like) obtained from the first vehicle 10, estimates the current or future traveling position of the traffic violation vehicle, selects the second vehicle 30, and gives an instruction. Further, the server control unit 23 analyzes information (the picture of the traffic violation vehicle, and the like) obtained from the second vehicle 30, and performs a process of reading the license number of the traffic violation vehicle, a process of extracting a photograph of the face of the driver, or the like.

The second vehicle (collaborator vehicle) 30 includes a photographing unit 31, a position information acquisition unit 32, a storage unit 33, a control unit 34, and a communication unit 35.

The photographing unit 31 is a so-called in-vehicle camera, and includes a camera that photographs a forward view of the vehicle. Preferably, the photographing unit 31 should be a drive recorder that continuously generates continuous pictures (second picture) of the outside (forward view) of the vehicle during driving and records the generated picture in the storage unit 33. The photographing unit 31 generates the picture (particularly, the image of the number plate and the driver) of the traffic violation vehicle.

The position information acquisition unit 32 includes one or more receivers that corresponds to any satellite positioning system. For example, the position information acquisition unit 32 may include a GPS receiver. The position information acquisition unit 32 detects position information about the second vehicle 30. In the embodiment, the position information acquisition unit 32 can obtain the position information about a place where the picture of the traffic violation vehicle is generated.

The storage unit 33 is a device that records or stores a variety of information, and includes one or more memories. The "memory" includes, for example, a semiconductor memory, a magnetic memory and an optical memory, but is not limited to them. The storage unit 33 stores any information relevant to operations of the second vehicle 30. For example, the storage unit 33 stores the picture generated by the photographing unit 31 and the position information acquired by the position information acquisition unit 32, in association with timing information at the time of the generation of the picture. Further, the storage unit 33 accumulates a variety of information relevant to operations and control of the vehicle, as exemplified by a vehicle control program.

The control unit 34 includes one or more processors. The "processor" may be a general-purpose processor or may be a dedicated processor for a particular process. For example, an ECU mounted on the second vehicle 30 may function as the control unit 34. The control unit 34 controls the operation of the whole of the second vehicle 30. For example, the control unit 34 controls the photographing unit 31, the position information acquisition unit 32, the storage unit 33 and the communication unit 35, and performs all controls relevant to the traveling and operation of the host vehicle. The control unit 34 can perform image analysis, and may read the license number of the vehicle or extract a photograph of the face of the driver, from the picture of the traffic violation vehicle that is generated by the photographing unit 31.

The communication unit 35 includes a communication module that performs communication between the second vehicle 30 and the server 20 or between the second vehicle 30 and the first vehicle 10. The communication unit 35 may include a communication module that is connected to a network, or a communication module that supports mobile communication standards such as 4G and 5G. For example, an on-board communicator such as a DCM mounted on the second vehicle 30 may function as the communication unit 35. The communication unit 35 receives the characteristic information relevant to the characteristic of the traffic violation vehicle, from the server 20 or the first vehicle 10, and sends the picture (particularly, the image of the number plate and the driver) of the traffic violation vehicle, to the server 20.

Figure 2:
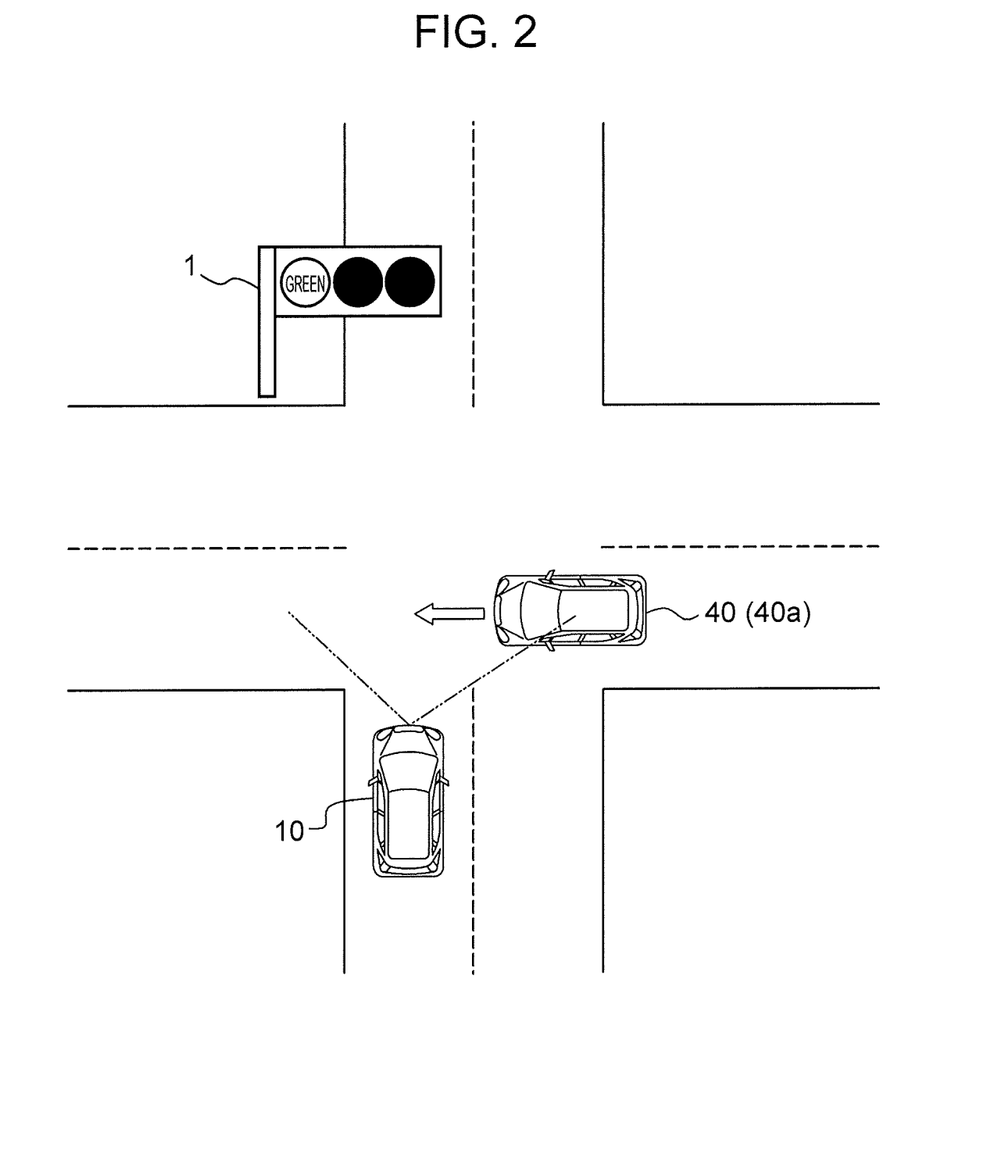
FIG. 2 is a diagram for describing a first situation in which a first vehicle detects a traffic violation vehicle.

A first situation in which the first vehicle 10 detects (finds) the traffic violation vehicle will be described with use of FIG. 2. FIG. 2 shows a situation in which the first vehicle (host vehicle) 10 approaches the intersection (or the first vehicle 10 in a stop state starts to move). When the color of a traffic light 1 in the host-vehicle travel direction is green, the first vehicle 10 detects a vehicle 40 that crosses in front of the host vehicle at the intersection, as a traffic violation (red light running) vehicle 40 (40a), and generates (photographs) a picture of the traffic violation vehicle 40a together with a picture of the traffic light 1, with the photographing unit 11 of the host vehicle 10. The reason for the determination of the red light running is that the color of a traffic light on a road orthogonal to the host-vehicle travel direction is inevitably red when the color of the traffic light 1 in the host-vehicle travel direction is green.

The first vehicle 10 records the picture of the traffic violation vehicle 40*a* generated by the photographing unit 11, in the storage unit 13, analyzes the picture of the traffic violation vehicle 40*a* with the control unit 14, and extracts the characteristic information (color, shape, vehicle type and the like) about the traffic violation vehicle 40*a*, the traveling speed, the traveling direction, and the like. Further, the first vehicle 10 acquires the current position (the position of the intersection) with the position information acquisition unit 12, and sends the current position together with the evidence picture of the traffic violation (the picture of the traffic light and the traffic violation vehicle), to the server 20 through the communication unit 15. Alternatively, the host vehicle (first vehicle) 10 may send the information directly to the other vehicle (second vehicle) 30 by the inter-vehicle communication, without the server 20.

In the case where the first vehicle 10 can continuously generate pictures for a long period of time with a drive recorder or the like, the first vehicle 10 performs the detection of the color of the traffic light 1 from a time when the vehicle 40 enters the intersection to a time when the vehicle 40 finishes passing through the intersection. Then, the first vehicle 10 confirms that the color of the traffic light is green all the while (that the color was green when the vehicle 40 entered the intersection), and makes the determination of the traffic violation (red light running). As the evidence picture of the traffic violation, the first vehicle 10 may acquire the whole pictures from the time when the traffic violation vehicle 40*a* enters the intersection to the time when the traffic violation vehicle 40*a* finishes passing through the intersection.

Figure 3:
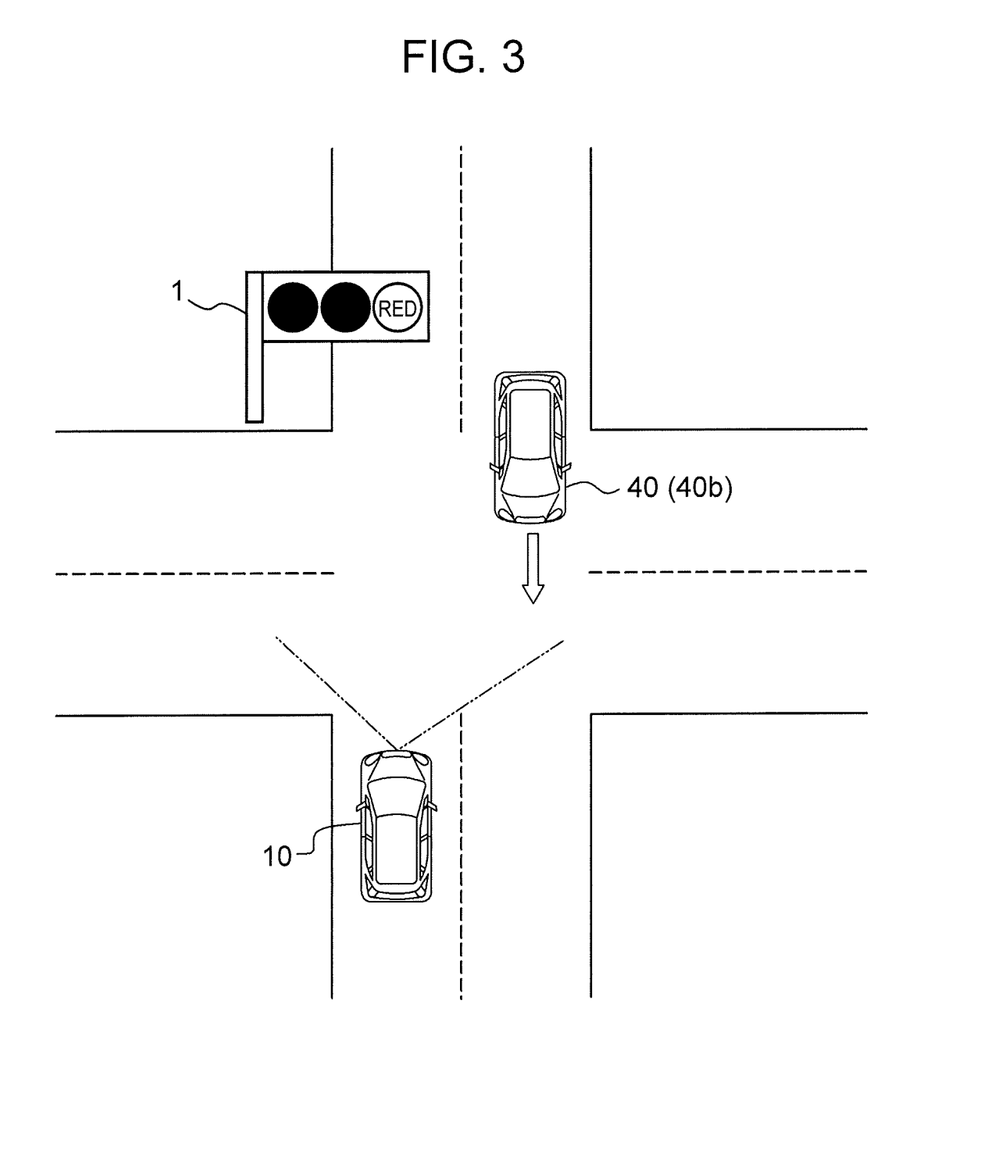
FIG. 3 is a diagram for describing a second situation in which the first vehicle detects the traffic violation vehicle.

A second situation in which the first vehicle 10 detects (finds) the traffic violation vehicle will be described with use of FIG. 3. FIG. 3 shows a situation in which the first vehicle (host vehicle) 10 is stopped at the intersection. When the color of the traffic light 1 in the host-vehicle travel direction is red, the first vehicle 10 detects an oncoming vehicle 40 that is traveling on an opposite lane at the intersection, as a traffic violation (red light running) vehicle 40 (40*b*), and generates (photographs) a picture of the traffic violation vehicle 40*b* together with a picture of the traffic light 1, with the photographing unit 11 of the first vehicle 10. This is because there is a high possibility that the color of a traffic light on an opposite lane is red when the color of the traffic light 1 in the host-vehicle travel direction is red. However, at some intersections, traffic lights are controlled such that the color of the traffic light on the opposite lane is green even when the color of the traffic light 1 in the host-vehicle travel direction is red. Therefore, it is possible to perform the determination more exactly, by acquiring a control method for the traffic lights at each intersection and determining whether the oncoming vehicle 40 has performed the traffic violation in view of the control method.

The first vehicle 10 records the picture of the traffic violation vehicle 40*b* that is generated by the photographing unit 11, in the storage unit 13, analyzes the picture of the traffic violation vehicle 40*b* with the control unit 14, and extracts the characteristic information (color, shape, vehicle type and the like) about the traffic violation vehicle 40*b*, the traveling speed, the traveling direction, and the like. Further, the first vehicle 10 acquires the current position (the position of the intersection) with the position information acquisition unit 12, and sends the current position, together with the evidence picture of the traffic violation (the picture of the traffic light and the traffic violation vehicle), to the server 20 or the other vehicle (second vehicle) 30 through the communication unit 15.

Furthermore, in the case of the oncoming vehicle 40 that is traveling on the opposite lane, the photographing unit 11 of the first vehicle 10 can sometimes take a picture of the number plate and driver of the traffic violation vehicle 40*b*. When the first vehicle 10 can obtain the picture of the number plate and the face of the driver, the first vehicle 10 sends the picture to the server 20.

In the case where the first vehicle 10 can continuously generate pictures for a long period of time with a drive recorder or the like, the first vehicle 10 performs the detection of the color of the traffic light 1 from a time when the vehicle 40 enters the intersection to a time when the vehicle 40 finishes passing through the intersection. Then, the first vehicle 10 confirms that the color of the traffic light is red all the while (that the color is red at the time when the vehicle 40 enters the intersection), and makes the determination of the traffic violation (red light running). It is preferable that the evidence picture of the traffic violation be the whole pictures from the time when the traffic violation vehicle 40*b* enters the intersection to the time when the vehicle 40*b* finishes passing through the intersection.

Figure 4:
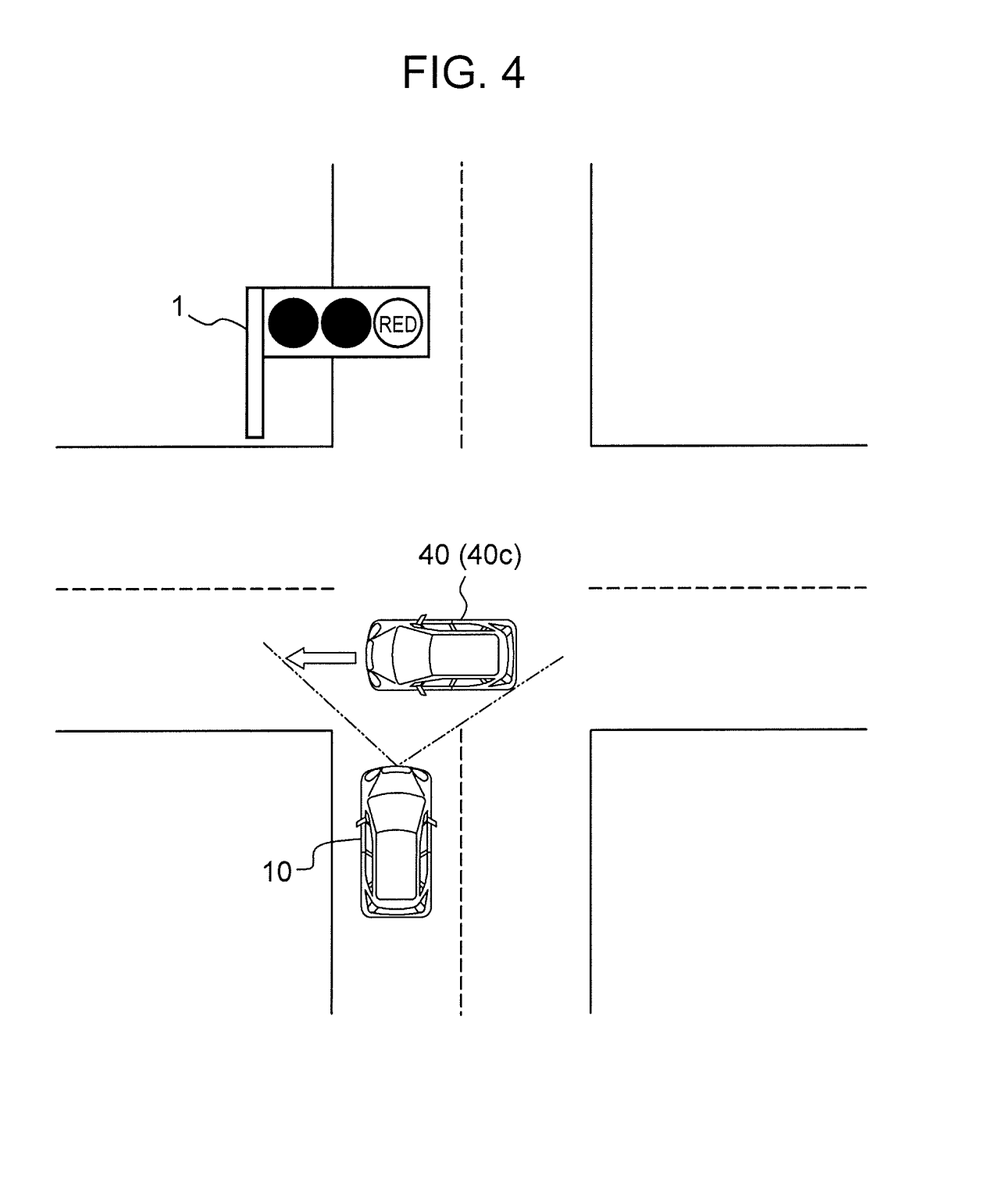
FIG. 4 is a diagram for describing a third situation in which the first vehicle detects the traffic violation vehicle.

A third situation in which the first vehicle 10 detects (finds) the traffic violation vehicle will be described with use of FIG. 4. FIG. 4 shows a situation in which the first vehicle (host vehicle) 10 is stopped at the intersection. When the color of the traffic light 1 in the host-vehicle travel direction is red, the first vehicle 10 generates (takes) the picture of the vehicle 40 that passes so as to cross in front of the host vehicle at the intersection, and monitors the traveling speed of the vehicle 40. The traveling speed can be estimated by analyzing the picture of the vehicle 40 with the control unit 14. When the traveling speed of the vehicle 40 exceeds the limiting speed of a road orthogonal to the host-vehicle travel direction, the first vehicle 10 detects the vehicle 40 as a traffic violation (limiting speed offense, so-called speeding violation) vehicle 40 (40*c*), and records a picture of the traffic violation vehicle 40*c* that is generated by the photographing unit 11, in the storage unit 13, together with the picture of the traffic light 1. The limiting speed of each road can be acquired from general traffic information.

The first vehicle 10 records the picture of the traffic violation vehicle 40*c* that is generated by the photographing unit 11, in the storage unit 13, analyzes the picture of the traffic violation vehicle 40*c* with the control unit 14, and extracts the characteristic information (color, shape, vehicle type and the like) about the traffic violation vehicle 40*c*, the traveling speed, the traveling direction, and the like. The first vehicle 10 acquires the current position (the position of the intersection) with the position information acquisition unit 12, and sends the current position together with the evidence picture of the traffic violation (the picture of the traffic light and the traffic violation vehicle), to the server 20 or the other vehicle (second vehicle) 30 through the communication unit 15.

It is preferable that the evidence picture of the traffic violation be the whole picture from a time when the traffic violation vehicle 40*c* enters the intersection to a time when the traffic violation vehicle 40*c* finishes passing through the intersection.

Figure 5:
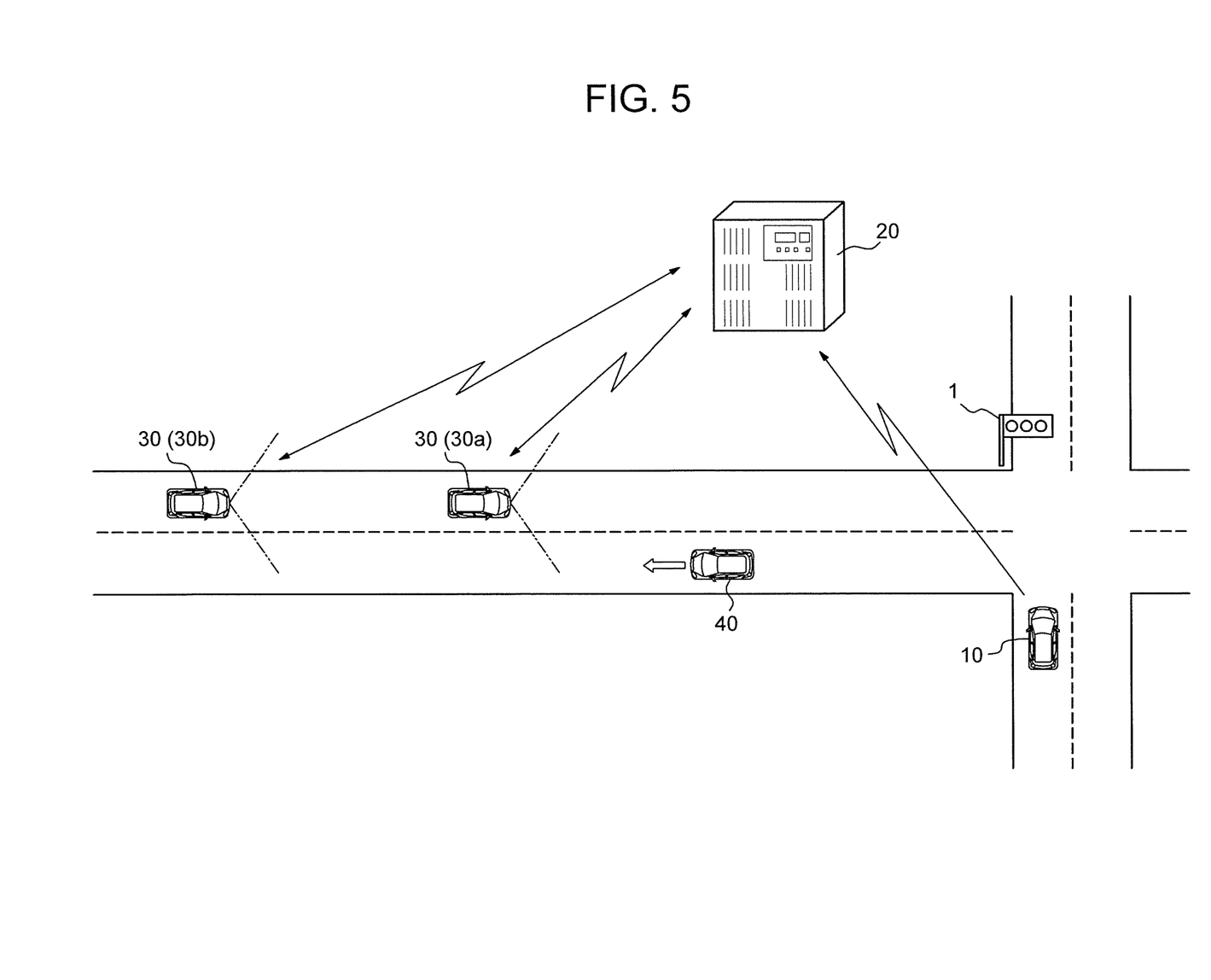

FIG. 5 is a diagram for describing a situation in which the second vehicle (collaborator vehicle) 30 photographs the license number of the traffic violation vehicle 40, and the like. FIG. 5 shows an exemplary control in the traffic violation vehicle identification system A after the detection of the traffic violation vehicle 40 from the picture of the crossing vehicle in FIG. 2 or FIG. 4, for example.

As described above, when the first vehicle 10 detects the traffic violation while photographing the traffic light 1 in the host-vehicle travel direction and the vehicle 40 that passes so as to cross in front of the host vehicle with the photographing unit (in-vehicle camera) 11 of the host vehicle, the first vehicle 10 sends the violation vehicle information including the characteristic information (color, shape, vehicle type and the like) about the traffic violation vehicle 40, the traveling speed, the traveling direction, the position of the intersection, and the like, and the evidence picture of the traffic violation, to the server 20.

As a method for giving the instruction to take a picture of the license number of the traffic violation vehicle and the like to the second vehicle (collaborator vehicle) 30, the server 20 sends the violation vehicle information (the characteristic information (color, shape, vehicle type and the like) about the traffic violation vehicle 40, the traveling speed, the traveling direction, the position of the intersection, and the like) from the first vehicle, to a plurality of second vehicles 30 near the intersection where the traffic violation is detected, at the same time. In this case, each of the second vehicles 30 determines the possibility of passing by the traffic violation vehicle 40, generates the second picture, which is obtained by photographing the outside of the second vehicle 30, and takes the picture of the number plate of the traffic violation vehicle and the like. Then, when the picture taking succeeds, the second vehicle 30 sends the picture to the server 20.

Another method for giving the instruction to take a picture of the license number of the traffic violation vehicle and the like to the second vehicle (collaborator vehicle) 30 is a method of giving the instruction to take a picture to a particular second vehicle 30. The server 20 grasps the positions of second vehicles 30 (30*a*, 30*b*, . . . ) that are traveling on roads. The server 20 estimates the current or future position of the traffic violation vehicle 40, based on the information (the traveling speed and traveling direction of the traffic violation vehicle 40, the position of the intersection, and the like) from the first vehicle 10. Then, to a second vehicle (collaborator vehicle) 30 that is traveling near the estimated position of the traffic violation vehicle 40, preferably, to a second vehicle 30*a* that is traveling on an opposite lane of a road on which the traffic violation vehicle 40 is traveling and that will pass by the traffic violation vehicle 40 first, the server 20 sends information necessary for the detection of the traffic violation vehicle 40, as exemplified by the characteristic information (color, shape, vehicle type and the like) about the traffic violation vehicle 40 and the estimated position, and gives the instruction to take the picture (particularly, the image of the number plate and the driver) of the traffic violation vehicle 40.

The second vehicle 30*a* detects the traffic violation vehicle (the vehicle that matches the characteristic information about the traffic violation vehicle) 40, from oncoming vehicles that pass on the opposite lane, based on the characteristic information about the traffic violation vehicle 40 and the like, and takes the picture (an image of at least one of the number plate and the driver) of the traffic violation vehicle 40, by an operation from a driver of the second vehicle 30*a* or automatically, to send the picture to the server 20. If the second vehicle 30*a* fails to take the picture, the second vehicle 30*a* sends a report of the failure to the server 20.

For example, in the case where the server 20 receives the report of the failure of the picture taking from the second vehicle 30*a* or in the case where the server 20 cannot extract the identification information such as the license number from the picture sent from the second vehicle 30*a*, the server 20 tries the picture taking by another vehicle. That is, to another second vehicle (collaborator vehicle) 30 that is traveling near the estimated current position of the traffic violation vehicle 40, preferably, to a second vehicle 30*b* that is traveling on the opposite lane of the road on which the traffic violation vehicle 40 is traveling and that will pass by the traffic violation vehicle 40 second, the server 20 sends the information necessary for the detection of the traffic violation vehicle 40, as exemplified by the characteristic information (color, shape, vehicle type and the like) about the traffic violation vehicle 40 and the estimated position, and gives the instruction to take a picture (particularly, the image of the number plate and the driver) of the traffic violation vehicle 40. Thus, in the case where the first-passing vehicle fails to take the picture of the traffic violation vehicle, the server 20 retries the picture taking such that the second-passing vehicle traveling in the direction opposite to the traveling direction of the traffic violation vehicle 40 takes the picture of the traffic violation vehicle 40.

The next second vehicle 30*b* specifies the traffic violation vehicle 40, based on the characteristic information about the traffic violation vehicle 40 and the like, and takes the picture (the image of at least one of the number plate and the driver) of the traffic violation vehicle 40, by an operation from a driver of the second vehicle 30*b* or automatically, to send the picture to the server 20. If the second vehicle 30*b* fails to take the picture, the second vehicle 30*a* sends a report of the failure to the server 20.

The server 20 repeats this operation until the picture (the image of the number plate and the driver, or the like) of the traffic violation vehicle 40 is successfully taken, and then collects the information from each vehicle. The server 20 extracts the license number of the traffic violation vehicle 40 and the photograph of the face of the driver, based on the picture from the second vehicle 30, and sends the identification information (the license number or the like) by which the traffic violation vehicle 40 is uniquely identified, to a client (for example, a system that is managed by the police), together with the evidence picture of the traffic violation. In the case where the picture taking of the traffic violation vehicle 40 by the second vehicle (or the subsequent identification information extraction) fails multiple times, there is a possibility that the traffic violation vehicle 40 has been altered (for example, the number plate is covered), and therefore, the server 20 may stop the retry operation after a predetermined number of retries. In this case, the server 20 sends only the evidence picture of the traffic violation photographed at the intersection and the characteristic information about the vehicle, to the client.

In the case described with FIG. 5, the traffic violation vehicle identification system A tracks the crossing vehicle 40 that passes so as to cross in front of the first vehicle 10 at the intersection. In the case where the oncoming vehicle 40 for the first vehicle 10 performs the traffic violation and the first vehicle 10 fails to take the picture of the number plate and driver of the traffic violation vehicle 40, the server 20, similarly, gives the instruction to take the picture of the traffic violation vehicle 40, to a second vehicle 30 that is a following vehicle for the first vehicle 10.

Further, in FIG. 5, the information from the first vehicle 10 is sent to the second vehicle 30 through the server 20. However, the first vehicle 10 may send the characteristic information (color, shape, vehicle type and the like) about the traffic violation vehicle 40, the traveling speed, the traveling direction and the like, directly to second vehicles 30 near the first vehicle 10, using the inter-vehicle communication. In this case, each second vehicle 30 determines the possibility of passing by the traffic violation vehicle 40 based on the traveling speed and traveling direction of the traffic violation vehicle 40 and the like (the possibility may be analyzed by the control unit 34), and tries taking the picture of the traffic violation vehicle 40. Also in this case, the picture of the traffic violation vehicle 40 is sent to the server 20, and is collected.

Figure 6:
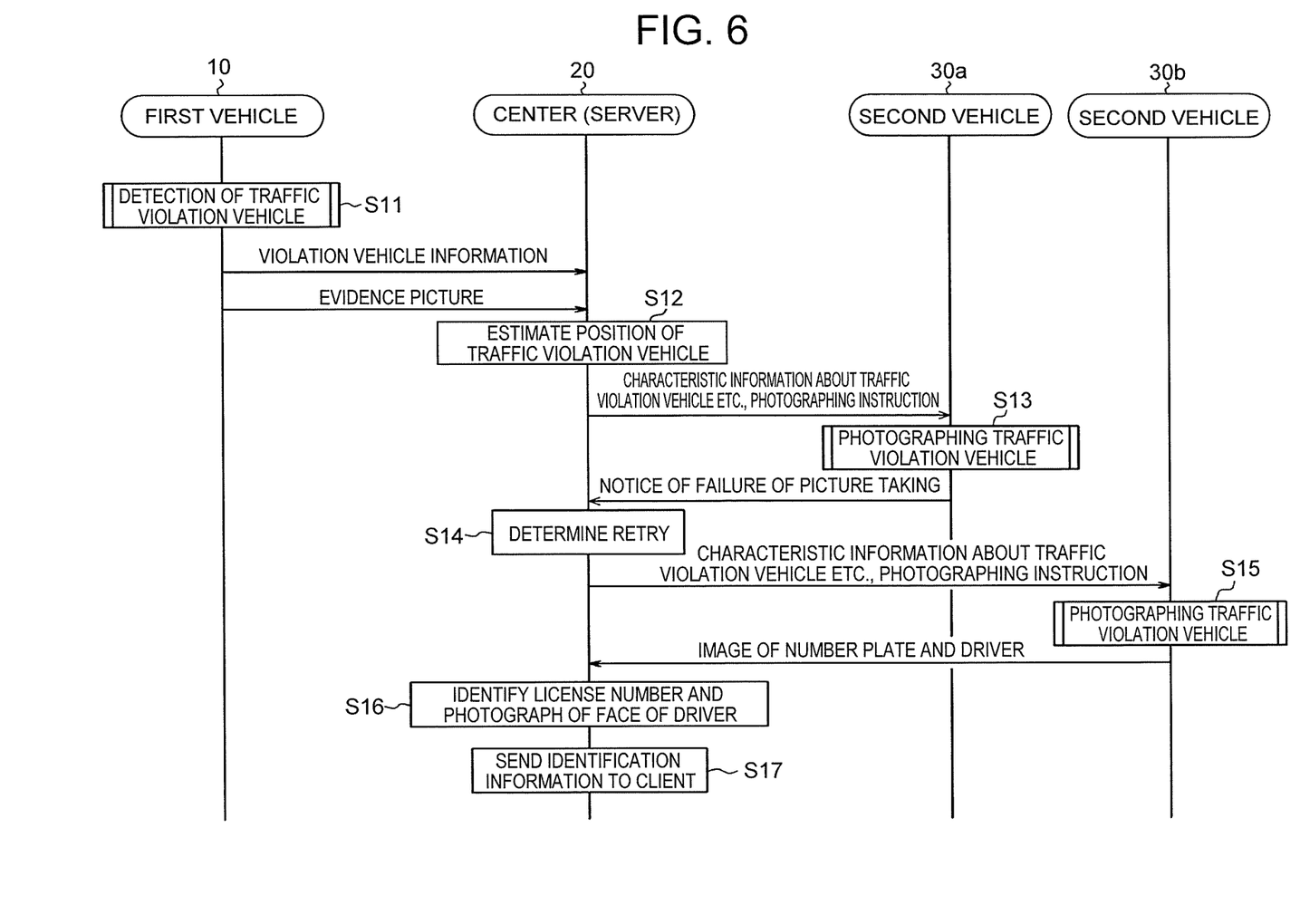
FIG. 6 is a diagram showing an exemplary operation of the traffic violation vehicle identification system in the embodiment of the disclosure.

FIG. 6 shows an exemplary operation of the traffic violation vehicle identification system A in the embodiment of the disclosure.

As shown in FIG. 6, first, the first vehicle 10 performs the detection of the traffic violation vehicle (step 11 (S11)). The detection of the traffic violation vehicle is performed in the following steps, based on a flowchart in FIG. 7.

Figure 7:
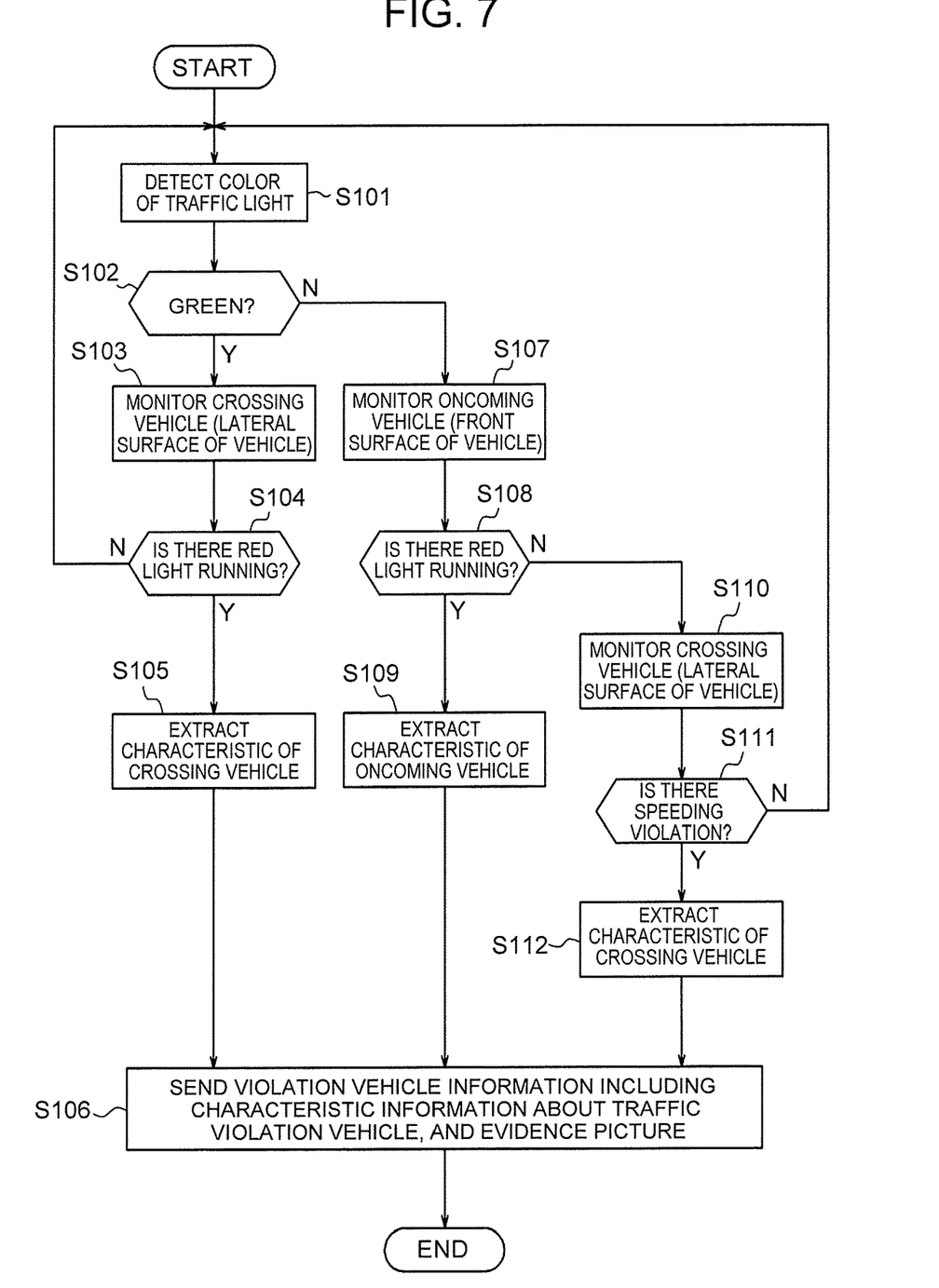
FIG. 7 is a flowchart of the detection of the traffic violation vehicle by the first vehicle.

Step 101 (S101): the first vehicle 10 generates the picture (first picture) at the intersection with the photographing unit 11, and detects the color of the traffic light in the host-vehicle travel direction. The operating subject of the following steps is the first vehicle 10.

Step 102 (S102): the first vehicle 10 determines whether the color of the traffic light in the host-vehicle travel direction is green. When the color is green, the first vehicle 10 proceeds to step 103, and when the color is red, the first vehicle 10 proceeds to step 107.

Step 103 (S103): the first vehicle 10 monitors the crossing vehicle (a lateral surface of the vehicle) on the road in front of the host vehicle.

Step 104 (S104): the first vehicle 10 determines whether there is a red light running violation. The color of the traffic light in the host-vehicle travel direction is green, and therefore, when there is a crossing vehicle that crosses in front of the host vehicle, the first vehicle 10 makes the determination of the red light running violation, and proceeds to step 105. When there is no red light running violation, the first vehicle 10 returns to the beginning (S101).

Step 105 (S105): the first vehicle 10 extracts the characteristic information about the crossing vehicle (traffic violation vehicle), from the picture of the crossing vehicle performing the red light running. For example, the first vehicle 10 analyzes and extracts the characteristic information such as the color, shape and vehicle type of the traffic violation vehicle. Furthermore, the first vehicle 10 extracts the traveling speed, the traveling direction and the like. Thereafter, the first vehicle 10 proceeds to step 106.

Step 106 (S106): the first vehicle 10 notifies the center (server) 20 or the second vehicle 30 of the violation vehicle information including the characteristic information about the traffic violation vehicle extracted in step 105. Further, the first vehicle 10 sends at least a part of the first picture including the evidence picture (the picture of the traffic light and the traffic violation vehicle) of the traffic violation, to the server 20. After the sending, the first vehicle 10 ends the processing.

Step 107 (S107): when the color of the traffic light in the host-vehicle travel direction is red, the first vehicle 10 monitors the oncoming vehicle (the front surface of the vehicle) on the opposite lane.

Step 108 (S108): the first vehicle 10 determines whether there is a red light running violation. The color of the traffic light in the host-vehicle travel direction is red, and therefore, when the oncoming vehicle enters the intersection, the first vehicle 10 makes the determination of the red light running violation, and proceeds to step 109. When there is no red light running violation, the first vehicle 10 proceeds to the next step 110.

Step 109 (S109): the first vehicle 10 extracts the characteristic information about the oncoming vehicle (traffic violation vehicle), from the picture of the oncoming vehicle performing the red light running. For example, the first vehicle 10 analyzes and extracts the characteristic information such as the color, shape and vehicle type of the traffic violation vehicle. Furthermore, the first vehicle 10 extracts the traveling speed, the traveling direction and the like. Thereafter, the first vehicle 10 proceeds to step 106.

Step 110 (S110): when there is no red light running of the oncoming vehicle, the first vehicle 10 monitors the crossing vehicle (a lateral surface of the vehicle) on the road in front of the host vehicle. 10065j Step 111 (S111): the first vehicle 10 generates the picture of the vehicle that passes so as to cross in front of the host vehicle at the intersection, and monitors the traveling speed of the vehicle by analyzing the picture. When the traveling speed of the crossing vehicle exceeds the limiting speed of the road orthogonal to the host-vehicle travel direction, the first vehicle 10 makes the determination of the speeding violation, and proceeds to step 112. When there is no speeding violation, the first vehicle 10 returns to the beginning (S101).

Step 112 (S112): the first vehicle 10 extracts the characteristic information about the crossing vehicle (traffic violation vehicle), from the picture of the crossing vehicle performing the speeding violation. For example, the first vehicle 10 analyzes and extracts the characteristic information such as the color, shape and vehicle type of the traffic violation vehicle. Furthermore, the first vehicle 10 extracts the traveling speed, the traveling direction and the like. Thereafter, the first vehicle 10 proceeds to step 106.

The program for executing the processing in the flowchart shown in FIG. 7 can be configured as a vehicle control program of the first vehicle 10. That is, the vehicle control program may cause the control unit of the first vehicle to execute: a step of generating the first picture by photographing the traffic light in the host-vehicle travel direction and the oncoming vehicle or crossing vehicle at the intersection with the photographing unit 11; a step of determining whether there is a traffic violation by the oncoming vehicle or the crossing vehicle, based on the first picture; a step of extracting the violation vehicle information including the characteristic information about the traffic violation vehicle from the first picture, when there is the traffic violation; and a step of sending the violation vehicle information including the characteristic information about the traffic violation vehicle and at least a part of the first picture including the evidence picture of the traffic violation, to the server, with a sending unit.

Back to FIG. 6, the processing of detecting the traffic violation vehicle causes the first vehicle 10 to send the violation vehicle information including the characteristic information about the traffic violation vehicle and the evidence picture (the picture of the traffic light and the traffic violation vehicle) of the traffic violation, to the server 20.

In the case where the traffic violation vehicle is the oncoming vehicle of the first vehicle 10 and the identification information (the license number or the like) about the traffic violation vehicle can be extracted from the picture of the traffic violation vehicle sent from the first vehicle 10, the server 20 may proceed directly to a step (S16) of identifying the license number and the photograph of the face of the driver (a step of extracting the identification information), without performing subsequent processing, namely the next traffic violation vehicle position estimation (S12) and the like.

The server 20 estimates the current or future position of the traffic violation vehicle, from the sent traveling speed and traveling direction of the traffic violation vehicle, and the like (step 12 (S12)). Then, to the second vehicle 30a that is traveling on the opposite lane of the road on which the traffic violation vehicle is traveling and that will pass by the traffic violation vehicle first, the server 20 sends the information necessary for the detection of the traffic violation vehicle 40, as exemplified by the characteristic information (color, shape, vehicle type and the like) about the traffic violation vehicle and the estimated position, and gives the instruction to take the picture (particularly, the image of the number plate and the driver) of the traffic violation vehicle.

The second vehicle 30a photographs the traffic violation vehicle (step 13 (S13)). The traffic violation vehicle is photographed in the following steps, based on a flowchart of FIG. 8.

Figure 8:
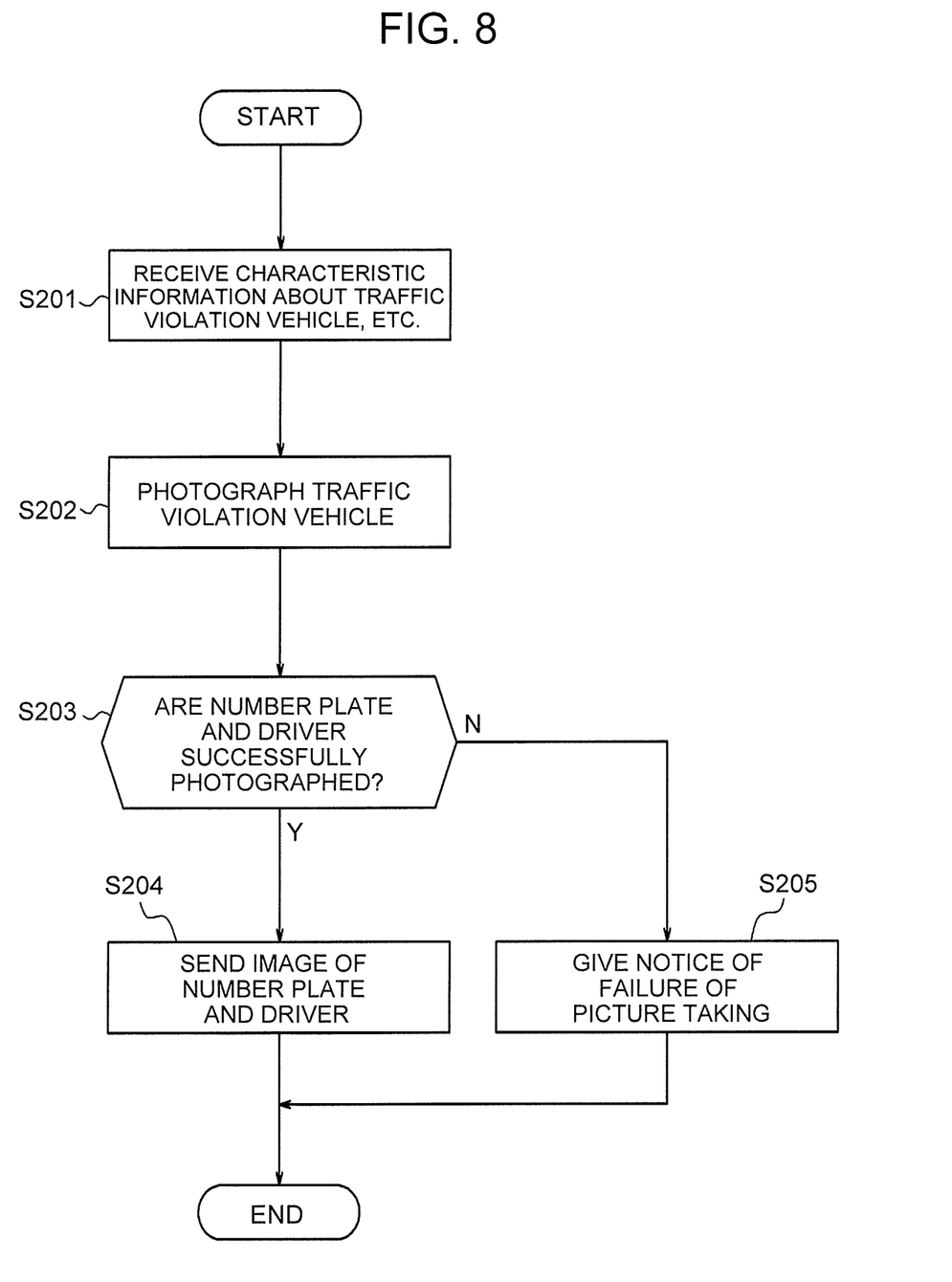
FIG. 8 is a flowchart of photographing the traffic violation vehicle by the second vehicle.

Step 201 (S201): the second vehicle 30 receives the characteristic information (color, shape, vehicle type and the like) about the traffic violation vehicle from the server 20 (or directly from the first vehicle 10). The operating subject of the following steps is the second vehicle 30.

Step 202 (S202): the second vehicle 30 generates the picture (second picture), which is obtained by photographing the outside of the host vehicle, with the photographing unit 31, detects the vehicle that matches the characteristic information about the traffic violation vehicle, from oncoming vehicles that pass on the opposite lane in the picture, and photographs the traffic violation vehicle (particularly, the number plate and the driver).

Step 203 (S203): the second vehicle 30 determines whether the number plate and driver of the traffic violation vehicle are successfully photographed. When the photographing is successful, the second vehicle 30 proceeds to step 204, and when the photographing is not successful, the second vehicle 30 proceeds to step 205.

Step 204 (S204): the second vehicle 30 sends the image including at least one of the number plate of the traffic violation vehicle and the face of the driver, to the server 20. After the sending, the second vehicle 30 ends the processing.

Step 205 (S205): when the taking of the picture of the traffic violation vehicle is not successful, the second vehicle 30 gives a notice of the failure of the picture taking, to the server 20. After the notification, the second vehicle 30 ends the processing flow.

Back to FIG. 6, here, suppose that the second vehicle 30a fails to take the picture of the traffic violation vehicle. In accordance with the processing of photographing the traffic violation vehicle, the second vehicle 30a sends the notice of the failure of the picture taking, to the server 20.

In the case of the failure of the picture taking, the server 20 determines whether to retry the picture taking of the traffic violation vehicle (step 14 (S14)). Specifically, it is preferable to previously set the number of retries. The reason is that the increase in the number of retries makes it difficult to estimate the position of the traffic violation vehicle, and that there is a possibility that the traffic violation vehicle has been altered (for example, the number plate is covered), and in this case, the picture taking itself of the identification information is difficult.

When the number of retries is a predetermined number or less, the server 20 sends the necessary information, as exemplified by the characteristic information (color, shape, vehicle type and the like) about the traffic violation vehicle and the estimated position, and gives the instruction to take the picture (particularly, the image of the number plate and the driver) of the traffic violation vehicle, to the second vehicle 30b that is traveling on the opposite lane of the road on which the traffic violation vehicle is traveling and that will pass by the traffic violation vehicle second.

The second vehicle 30b photographs the traffic violation vehicle, in accordance with the processing of photographing the traffic violation vehicle in FIG. 8 (step 15 (S15)). When the photographing succeeds, the second vehicle 30b sends the image including at least one of the number plate of the traffic violation vehicle and the face of the driver, to the server 20.

Based on the image sent from the second vehicle 30, the server 20 identifies the license number of the traffic violation vehicle and the photograph of the face of the driver (the extraction of the identification information) (step 16 (S16)). Then, the server 20 sends the identification information about the traffic violation vehicle (the license number, the face photograph and the like), to the client (for example, a system that is managed by the police), together with the evidence picture of the traffic violation (step 17 (S17)). The server 20 may further send the information accumulated in the server 20, to the client.

For example, the information to be provided to the client (that is, information items to be accumulated in the server 20 for the police and data formats of the information items) is shown as follows.

Date and time of occurrence: 2018.10.11.23:33
Violation vehicle speed: 50.0 km/h
Position information: 38.33333, 135.22222
Detailed position information:  Prefecture  City **
Violation content: red light running
License number: Shinagawa 500 Sa 00-00
Detailed violation information: use of the brake, accelerator operation amount and the like
Image thumbnail: driver face image, evidence picture Although the above embodiment describes the configuration and operation of the traffic violation vehicle identification system A, the disclosure is not limited to the traffic violation vehicle identification system and may be configured as a traffic violation vehicle identification method. That is, as another embodiment, the disclosure may be configured as a method of detecting and identifying the traffic violation vehicle with a plurality of vehicles and a server in accordance with the process and the flow of data in FIG. 6.

The above embodiment has been described as a typical example, and it is obvious to a person skilled in the art that many alterations and replacements can be made within the spirit and scope of the disclosure. Therefore, it should not be understood that the disclosure is limited to the above embodiments, and various modifications and alterations can be made without departing from the scope of the claims. For example, a plurality of constituent blocks described in the embodiment can be combined to a single constituent block, or a single constituent block described in the embodiment can be divided.

What is claimed is:
1. A traffic violation vehicle identification system, comprising:
a first vehicle;
a second vehicle; and
a server, wherein
the first vehicle is configured to:

generate a first picture by photographing a traffic light in an travel direction of the first vehicle and an oncoming vehicle or a crossing vehicle at an intersection, and send violation vehicle information including characteristic information about a traffic violation vehicle performing a traffic violation and a first sending picture, to the server, when the first vehicle detects the traffic violation vehicle in the first picture, the first sending picture being at least a part of the first picture including an evidence picture of the traffic violation, the characteristic information being extracted from the first picture, the server is configured to:

extract identification information by which the traffic violation vehicle is uniquely identified, from the first sending picture, store the identification information, and send the identification information about the traffic violation vehicle and the evidence picture of the traffic violation, to a client, the server is configured to send the characteristic information about the traffic violation vehicle, to the second vehicle, when the server is not able to extract the identification information from the first sending picture, the second vehicle is configured to generate a second picture by photographing an outside of the second vehicle, and send a second sending picture to the server, when the second vehicle detects the traffic violation vehicle in the second picture based on the characteristic information, the second sending picture being at least a part of the second picture including the traffic violation vehicle, and the server is configured to extract the identification information by which the traffic violation vehicle is uniquely identified, based on the second sending picture, and store the identification information.

2. The traffic violation vehicle identification system according to claim 1, wherein the violation vehicle information further includes information of a traveling speed and a traveling direction of the traffic violation vehicle; and the server is configured to estimate a current or future traveling position of the traffic violation vehicle from the violation vehicle information, and send the characteristic information about the traffic violation vehicle, to the second vehicle near the estimated position.

3. The traffic violation vehicle identification system according to claim 2, wherein the server is configured to, when the server is not able to extract the identification information from the second sending picture:

estimate again the current or future traveling position of the traffic violation vehicle from the violation vehicle information sent from the first vehicle, send the characteristic information about the traffic violation vehicle, to another second vehicle near the estimated position, and repeat sending the characteristic information about the traffic violation vehicle to another second vehicle near the estimated position, until the server is able to extract the identification information, or up to a predetermined number of times.

4. The traffic violation vehicle identification system according to claim 1, wherein the first vehicle is configured to detect, as the traffic violation vehicle, an oncoming vehicle that enters the intersection when a color of the traffic light in the travel direction of the first vehicle is red, a vehicle that crosses in front of the first vehicle at the intersection when the color of the traffic light in the travel direction of the first vehicle is green, and a vehicle that crosses in front of the first vehicle at a traveling speed exceeding a limiting speed of a road when the color of the traffic light in the travel direction of the first vehicle is red.

5. The traffic violation vehicle identification system according to claim 2, wherein the first vehicle is configured to detect, as the traffic violation vehicle, an oncoming vehicle that enters the intersection when a color of the traffic light in the travel direction of the first vehicle is red, a vehicle that crosses in front of the first vehicle at the intersection when the color of the traffic light in the travel direction of the first vehicle is green, and a vehicle that crosses in front of the first vehicle at a traveling speed exceeding a limiting speed of a road when the color of the traffic light in the travel direction of the first vehicle is red.

6. The traffic violation vehicle identification system according to claim 3, wherein the first vehicle is configured to detect, as the traffic violation vehicle, an oncoming vehicle that enters the intersection when a color of the traffic light in the travel direction of the first vehicle is red, a vehicle that crosses in front of the first vehicle at the intersection when the color of the traffic light in the travel direction of the first vehicle is green, and a vehicle that crosses in front of the first vehicle at a traveling speed exceeding a limiting speed of a road when the color of the traffic light in the travel direction of the first vehicle is red.

7. The traffic violation vehicle identification system according to claim 1, wherein the evidence picture includes a picture of the traffic light and the traffic violation vehicle.

8. The traffic violation vehicle identification system according to claim 1, wherein the evidence picture includes a whole picture from a time when the traffic violation vehicle enters the intersection to a time when the traffic violation vehicle finishes passing through the intersection.

9. The traffic violation vehicle identification system according to claim 1, wherein the characteristic information includes information on at least one of a color, a shape, and a vehicle type of the traffic violation vehicle.

10. The traffic violation vehicle identification system according to claim 1, wherein the identification information includes at least one of a license number of the traffic violation vehicle and a face photograph of a driver of the traffic violation vehicle.

11. A server, comprising;

circuitry configured to:

receive violation vehicle information and a first sending picture from a first vehicle, the violation vehicle information including characteristic information about a traffic violation vehicle performing a traffic violation, the first sending picture being at least a part of a first picture including an evidence picture of the traffic violation;

extract identification information by which the traffic violation vehicle is uniquely identified, from the first sending picture;

store the identification information;

send the identification information about the traffic violation vehicle and the evidence picture of the traffic violation, to a client;

send the characteristic information about the traffic violation vehicle, to a second vehicle, when the server is not able to extract the identification information from the first sending picture; and extract the identification information by which the traffic violation vehicle is uniquely identified, from a second sending picture which is at least a part of a second picture sent from the second vehicle.

12. The server according to claim 11, wherein:

the violation vehicle information further includes information of a traveling speed and a traveling direction of the traffic violation vehicle; and the circuitry is configured to estimate a current or future traveling position of the traffic violation vehicle from the violation vehicle information, and send the characteristic information about the traffic violation vehicle, to the second vehicle near the estimated position.

13. The server according to claim 12, wherein the circuitry is configured to, when the server is not able to extract the identification information from the second sending picture:

estimate again the current or future traveling position of the traffic violation vehicle from the violation vehicle information sent from the first vehicle, send the characteristic information about the traffic violation vehicle, to another second vehicle near the estimated position, and repeat sending the characteristic information about the traffic violation vehicle to another second vehicle near the estimated position, until the server is able to extract the identification information, or up to a predetermined number of times.

14. A non-transitory recording medium in which a vehicle control program is recorded, which when the vehicle control program is executed by a control unit of a first vehicle, the control unit of the first vehicle executes an operation, the operation comprising:

(a) generating a first picture by photographing a traffic light in a travel direction of the first vehicle and an oncoming vehicle or a crossing vehicle at an intersection with a photographing unit of the first vehicle;

(b) determining whether there is a traffic violation by the oncoming vehicle or the crossing vehicle, based on the first picture;

(c) extracting violation vehicle information including characteristic information about a vehicle performing the traffic violation, from the first picture, when there is the traffic violation; and (d) sending the violation vehicle information and a first sending picture to a server by a sending unit of the first vehicle, the violation vehicle information including the characteristic information about the vehicle performing the traffic violation, the first sending picture being at least a part of the first picture including an evidence picture of the traffic violation, wherein the operation (b) includes detecting, as a traffic violation vehicle performing the traffic violation, an oncoming vehicle that enters the intersection when a color of the traffic light in the travel direction of the first vehicle is red, a vehicle that crosses in front of the first vehicle at the intersection when the color of the traffic light in the travel direction of the first vehicle is green, and a vehicle that crosses in front of the first vehicle at a traveling speed exceeding a limiting speed of a road when the color of the traffic light in the travel direction of the first vehicle is red.

15. The non-transitory recording medium according to claim 14, wherein the evidence picture includes a picture of the traffic light and a traffic violation vehicle performing the traffic violation.

16. The non-transitory recording medium according to claim 14, wherein the evidence picture includes a whole picture from a time when a traffic violation vehicle performing the traffic violation enters the intersection to a time when the traffic violation vehicle finishes passing through the intersection.

* * * * *